United States Patent [19]
Dauge et al.

[11] 4,366,875
[45] Jan. 4, 1983

[54] CAPACITY MEASURING DEVICE USING RATIOS OF FREQUENCIES

[75] Inventors: Gilbert V. Dauge, 15, Quai du Pre Long, Lagny, France, 77400; Jacques F. Langlais, 38, rue des Ecoles, Coudray Montereaux, France, 77

[73] Assignees: Gilbert V. Dauge, 15, Quai du Pré Testut Aequitas, Paris, France

[21] Appl. No.: 229,157

[22] Filed: Jan. 28, 1981

[30] Foreign Application Priority Data

Feb. 4, 1980 [FR] France .......................... 80 02376

[51] Int. Cl.³ ............................................. G01G 3/14
[52] U.S. Cl. ........................ 177/210 C; 177/210 FP
[58] Field of Search ................ 177/210 C, 25, 210 FP

[56] References Cited

U.S. PATENT DOCUMENTS

| | | | |
|---|---|---|---|
| 3,172,493 | 3/1965 | Von Koch et al. | 177/210 C |
| 3,314,493 | 4/1967 | Kennedy | 177/210 C |
| 3,662,159 | 5/1972 | Schief | 177/210 FP X |
| 4,273,204 | 6/1981 | Gillen | 177/210 C |

FOREIGN PATENT DOCUMENTS

678323  5/1979  U.S.S.R. ....................... 177/210 FP

*Primary Examiner*—George H. Miller, Jr.
*Attorney, Agent, or Firm*—Dressler, Goldsmith, Shore, Sutker & Milnamow, Ltd.

[57] ABSTRACT

This invention relates to a capacity measuring device. A first capacity-frequency converter operates on the capacity to be measured and supplies a measurement frequency FM; a second capacity-frequency converter co-operates with a standard capacity and supplies a standard frequency FE. A calculation circuit determines $(M \cdot FM/FE) - N$ and a display circuit visualizes this numerical magnitude. The device can be used for weighing apparatus.

22 Claims, 7 Drawing Figures

FIG_1

FIG_2

FIG_3

FIG._4

FIG_5

FIG_7

FIG.6

CAPACITY MEASURING DEVICE USING RATIOS OF FREQUENCIES

BACKGROUND OF THE INVENTION

This invention relates to a capacity measuring device and is used in particular for weighing apparatus of the capacitive transducer type.

In such a weighing apparatus, the value of the load to be measured is transformed into that of a capacity. Where there is a zero load, the two electrodes of a capacitor are brought close to each other, thus defining a fairly high capacity value. When the load increases, the electrodes are moved away from each other and the value of the capacity decreases to a minimum value, which corresponds to the full scale deflection of the weighing apparatus.

In patent application No. 77 28 758 of Sept. 23, 1977, we proposed inserting measuring capacitors into a relaxation oscillator, the operating frequency of which is inversely proportional to the value of the capacity. With an arrangement of this type, a minimal frequency Fmin is thus obtained in the presence of zero load, and a maximum frequency Fmax is obtained in the presence of the maximum value of the load to be weighed. The arrangement is such that the frequency excursion which appears in the presence of an unknown load is very nearly proportional to the value of this load. The prior patent application also proposes using a standard capacity in addition to the capacity to be measured. The same oscillator sometimes functions with the measuring capacity and sometimes with the standard capacity.

Various difficulties result from this "multiplexing" of the same oscillator between the capacity to be measured and the standard capacity, in particular regarding adjustments required for controlling the general effect of the weighing apparatus.

SUMMARY OF THE INVENTION

An object of the present invention is to avoid the disadvantages outlined above.

The capacity measuring device which has been proposed comprises the following:

(a) a first capacity-frequency converter, operating on the capacity to be measured and supplying a measurement frequency FM;

(b) a second capacity-rrequency converter, operating on a standard capacity, and supplying a standard frequency FE;

(c) a calculation circuit adapted to determine a numerical magnitude related to the ratio of the measurement frequency FM to the standard frequency FE; and (d) a display circuit connected to the logical calculation circuit and adapted to display the numerical value of the said magnitude.

DESCRIPTION OF THE DRAWINGS

FIGS. 5A to 5E illustrate wave forms appearing at different points of the circuit of FIG. 3;

FIGS. 6A to 6L illustrate wave forms appearing at different points of the circuit of FIG. 4.

DETAILED DESCRIPTION OF THE INVENTION

According to a particular characteristic of this invention, the first capacity-frequency converter functions continuously, while the second capacity-frequency converter is stopped temporarily after the determination of the numerical magnitude by the calculation circuit, the end of this stop being synchronised in phase with the measurement frequency.

In a particular embodiment, each capacity-frequency converter comprises an operational amplifier, on which the associated capacity is branched in an integrating connection followed by a two-output comparator circuit, one output of which supplies the output frequency while the other is looped on the reverser input of the operational amplifier.

The tripping threshold of at least one of the comparator circuits is most advantageously controllable.

The first capacity-frequency converter measurement preferably comprises a capacitive means for compensating the internal delays thereof.

According to another particular characteristic of this invention, the first capacity-frequency converter comprises means for the production of a correction signal which modifies the comparison threshold of a quantity which is inversely proportional to the measurement frequency FM, the coefficient being controllable. It is therefore possible to effect a control of the zero of the apparatus without modifying the measuring range thereof.

According to another aspect of the present invention, the connection between an armature of the capacitor to be measured and the reverser input of the associated operational amplifier is encased and means are provided for maintaining this connection and the encasement thereof substantially at the same potential. This same encasement is connected to the earth of the neighbouring frame of the capacitor to be measured, which renders the device only slightly sensitive to leakage currents, notably due to the ambient humidity.

According to another advantageous characteristic of this invention, the minimum value of the measurement frequency is greater than the value of the standard frequency; the calculation circuit comprises a reference counter which is able to define a signal representing a reference period, counted over a predetermined number M of pulses of the standard frequency, a measurement counter circuit which is tripped at the same time as the reference counter and is able to count another predetermined number N of pulses at the measuring frequency FM, a principal memory counter, and logic means to apply to this principal counter, the pulses at the measurement frequency FM existing during the reference period but after the measuring counter has reached the predetermined count N, the contents of the principal counter then being of the form M·(FM)(FE)−N.

According to another characteristic of this invention, the measurement counter circuit comprises a first decade counter stage, and the logic means are commutable to authorize counting only over a complete number of periods of the decade counter, which allows, on command, a figure of the displayed numerical magnitude to be approximated. Therefore, it is possible to obtain a weighing apparatus with a "lens".

According to yet another aspect of the present invention, the measuring counter is at least partly a pre-controllable counter, and control means are provided for pre-controlling a number N while acting on this counter for a predetermined condition of the capacity to be measured, such as the absence of a load on the weighing apparatus. In this manner, an automatic reset of the weighing apparatus is easily effected.

Other characteristics and advantages of the invention will be revealed from reading the detailed description which follows, with reference to the accompanying drawings.

DESCRIPTION OF PREFERRED EMBODIMENT

Figure 1:
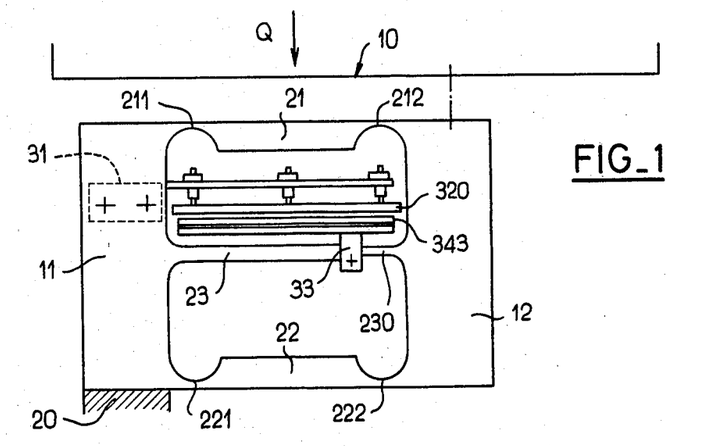
FIG. 1 schematically illustrates an example of a weighing apparatus provided with a capacitive transducer.

FIG. 1 illustrates the load receiver of an example of a weighing apparatus with a capacitive transducer. An integral deformable parallelogram is mounted on a frame 20 and is composed of four limbs 11, 12, 21 and 22, joined by constrictions 211, 212, 221 and 222. The upright limb 11 directly rests on the frame 20, while the upright limb 12 is acted on by the load Q positioned on the load-carrying plate 10 which is connected thereto. The support 31 of a first electrode 320 is attached to the fixed upright 11. The support 33 of a second electrode 343 is secured mounted between the uprights 11 and 12 on an intermediate bending arm 23, the second electrode 343 forming a capacitive transducer with the first electrode 320. While at rest, the first electrode 320 may be moved to regulate the spacing between the two electrodes to a desired value, corresponding to the maximum capacity. When a load is applied, the two electrodes move away from each other and hence there is a reduction in the capacity. Thus, a variable capacity related to the load to be measured is defined.

This arrangement corresponds to FIG. 1 of our prior patent application No. 79 08 218, to which reference should be made for greater detail. It will be noted that this prior application also describes means for constituting the standard capacity while producing a load receiver similar to that which is illustrated in FIG. 1, but which is only used for reference and is never loaded. The same prior application also provides relations to be observed between the different dimensions of the deformable parallelogram as well as of the armature supports. While simultaneously observing these relations for the effective load receiver and for the reference load receiver, excellent compensation is achieved for the variation with temperature of the modulus of elasticity of the material constituting the deformable parallelogram, and the zero is not displaced with variations of the temperature.

Another method of obtaining these same advantages comprises choosing a discrete capacitor as the standard capacity, the variation of which as a function of the temperature is equal to the variation of the modulus of elasticity (Young's modulus) of the material constituting the load receiver and naturally comprises observing the relations mentioned above for the effective load receiver.

The load receiver with a capacity transducer which is illustrated here in FIG. 1 is naturally only one example, and it is possible to use numerous other types of load receiver, in particular those described in our prior applications Nos., 79 11 457 or 79 28 300. The above remarks apply equally thereto.

Figure 2:
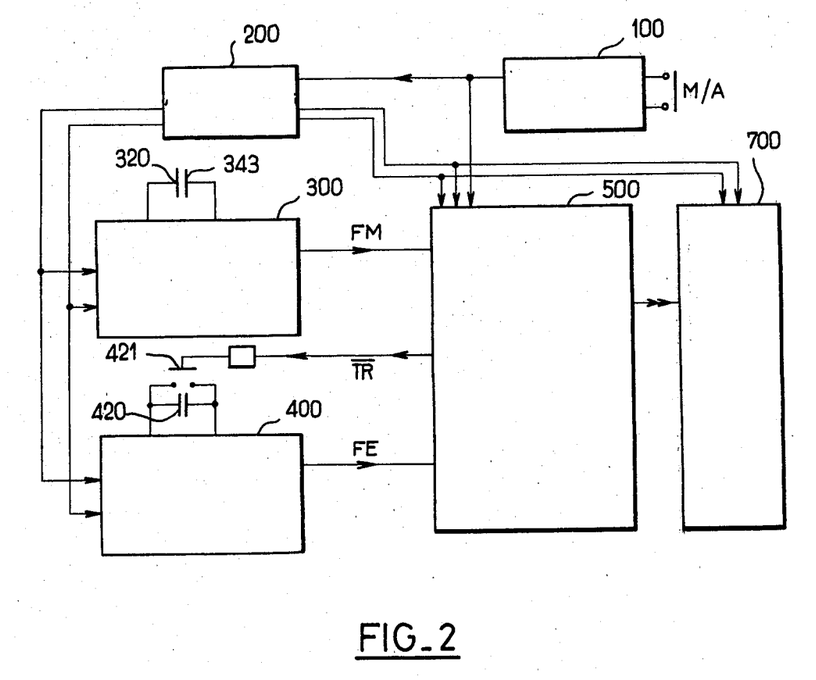
FIG. 2 illustrates a general electrical diagram of the electronic circuits provided according to a preferred embodiment of the present invention to be associated with a weighing apparatus provided with a capacitive transducer.

In the diagram of FIG. 2 showing the principle of operation, there is a first capacity-frequency converter 300, to which is connected the capacity to be measured defined by the two plates 320 and 343. There is also a second capacity-frequency converter 400 to which is connected the standard capacity 420. In parallel therewith is an interruptor 421 constituted, for example, by a field effect transistor and capable, on command, of short-circuiting the standard capacity 420. The measurement frequency FM, defined by the converter 300, and the standard frequency FE, defined by the converter 400, are fed to a logic calculation circuit 500, which, in turn, actuates a numerical display device 700. Finally, the connection comprises a supply circuit 200, and a stop-go control circuit 100 which reacts by a time-lag operation of the electronic circuits in reply to the operation of a stop-go push button M/A.

Figure 3:
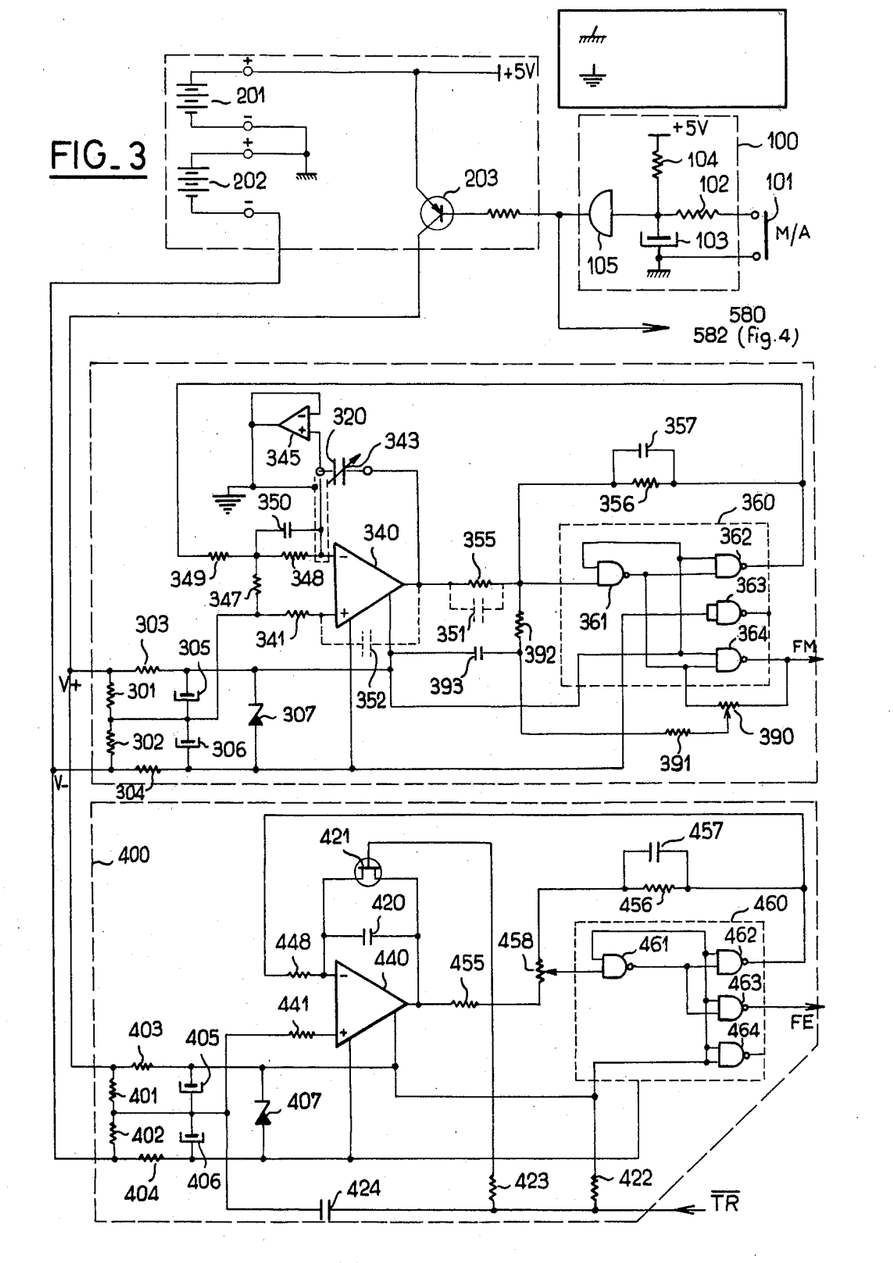
FIG. 3 illustrates a detailed electrical diagram of the stop-go control elements, of supply elements and the two capacity-frequency converters which appear in FIG. 2.

In FIG. 3, the supply circuit 200 comprises two primary batteries 201 and 202, the centre point of which is connected to the earth of the logic circuits, while the positive pole defines a voltage of $+4.5$ volts in the direction of the logic circuits of the connection, i.e. the components of the block 100, the block 500 and the block 700. It will be noted that this voltage of $+4.5$ volts is applied permanently, which is of no consequence to the level of consumption, this logic circuit being advantageously produced in complementary MOS technology.

The stop-go push button 101 is connected on one side to the earth of the logic circuits and on the other side by a resistor 102 to the point common to a resistor 104 which is connected to the $+4.5$ volts logic, and to a capacitor 103 which is connected to earth. The charge of the capacitor 103, which lasts approximately one minute, actuates a gate 105 which controls the transistor 203 incorporated in the supply 200, in order to power the two capacity-frequency converters 300 and 400. The output of the gate 105 is also applied to the circuit 500 for the purpose of resetting to the initial zero.

The two supply voltages thus applied to the capacity-frequency converters are denoted $V+$ and $V-$. These two voltages are received in the converter 300 and two equal resistors 301 and 302 are branched in series between $V+$ and $V-$, their centre point defining the earth of the first voltage-frequency converter. The line $V+$ is also connected by a resistor 303 to a capacitor 305 which is connected to the relevant earth, while for its part, the line $V-$ is connected by a resistor 304 to a capacitor 306 which is also connected to the same earth. A Zener diode 307 is connected between the extreme terminals of the capacitors 305 and 306, which diode controls the voltage. This connection, of a known type, stabilises the supply voltage of the converter 300. The connection exists in the converter 400; it will not be re-described since the same elements have the same reference number increased by 100. It will simply be noted that the centre point of the resistors 401 and 402 is not connected to the earth of the wiring so as to avoid the circulation of earth currents.

The first converter 300 comprises an operational amplifier 340, the non-reverser input of which is connected by a resistor 341 to earth, i.e. to the common point of the resistors 301 and 302. This same point is connected by a resistor 347, then by a resistor 348 to the reverser input of the operational amplifier 340. The plate 320 of the capacity to be measured is also connected to this reverser input, while the other plate 343 is connected to the output of the amplifier 340, thus forming an integrating connection. Finally, the amplifier 340 is supplied by the voltage at the terminals of the Zener diode 307.

The output of the amplifier 340 is connected by a resistor 355 to the input of a comparator connection 360, composed of four NO-AND gates 361 to 364, and they are also fed by the voltage at the terminals of the diode 307. The gate 363 is inoperative to this case. The input of the comparator 360 is composed of one of the inputs of the gate 361, the output of which is connected to an input of the gates 362 and 364. The other input of the gates 362 and 364 is connected in common, as well as at the second input of the gate 361. The skilled man will understand that this connection is designed to function as a Schmitt trigger. The output of the NO-AND gate 362 is returned by a parallel network of resistor 356 and capacitor 357 to the input of the connection of the comparator, i.e. the common point between the resistor 355 and one of the inputs of the gate 361. The resistors 355 and 356 define the threshold from which the comparator will be tripped for the positive voltages as well as for the negative voltages with respect to earth. Finally, the output of the gate 362 is returned by a resistor 349 to the common point of the resistors 347 and 348, and through that to the reverser input of the amplifier 340.

Figure 5:
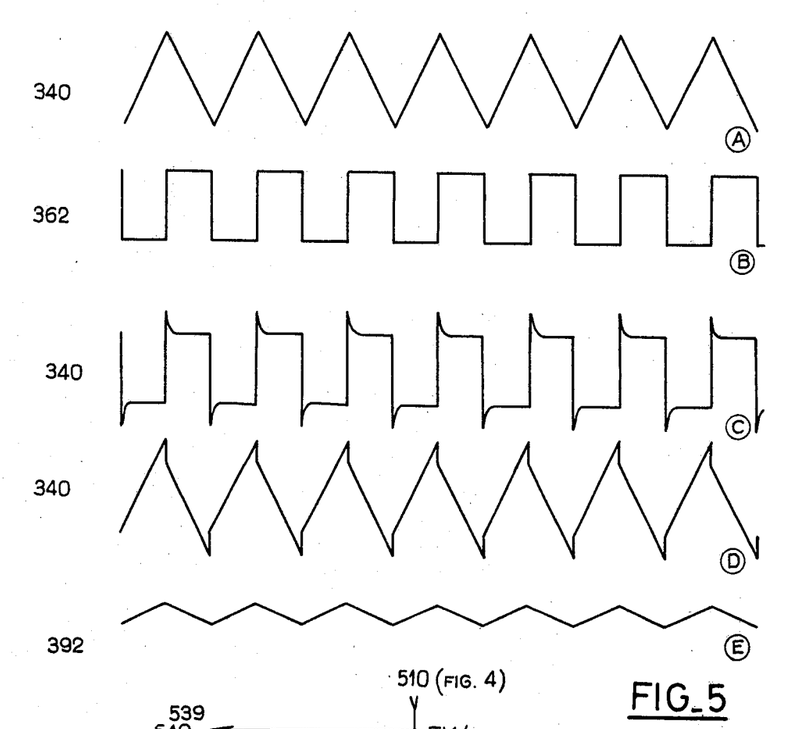

Functioning as an integrator, this amplifier 340 will thus see the output voltage thereof increase (FIG. 5A), while the output of the gate 362 is at a low level. When the output exceeds the threshold of the comparator, the latter is reversed, the output of the gate 362 then violently passing at the high level, while the amplifier 340 is now integrated with the reverse polarity, which supplies an alternating and symmetrical saw tooth output (FIG. 5A). The output of the gate 362 for its part will be a crenel voltage, the general form of which is illustrated in FIG. 5B.

The operation of the second capacity-frequency converter 400 is substantially the same. The centre point of the resistors 401 and 402 is connected by a resistor 441 to the non-reverser input of the operational amplifier 440. This receives the standard capacity 420 between its reverser input and its output. The output of the amplifier 440 is connected by a resistor 455 and a portion of a potentiometer 458 to a comparator circuit 460 with four NO-AND gates 461 to 464. The gate 464 is inoperative. The output of the gate 461 is connected in common to an input of the gate 462 and to an input of the gate 463. The other inputs of these two gates which are also connected in common, as well as to the second input of the gate 461, receive the positive voltage at the terminals of the Zener diode 407. Finally, the output of the NO-AND gate 462 is returned on one side by a parallel network of resistor 456 and capacitor 457 to the other end of the potentiometer 458. The output of the gate 462 is again returned by a resistor 448 to the reverser input of the operational amplifier 440. Here again, the output of the amplifier 440 is of the form illustrated in FIG. 5A, while the output of the comparator 460 (gate 462 for example) is of the form illustrated in FIG. 5B.

A signal TR is applied to a resistor 422 which is connected to the positive voltage at the terminals of the Zener diode 407, and to a capacitor 424 which is connected to the common point of the resistors 401 and 402, and also to a resistor 423 which controls the grid of a field effect transistor 421 mounted at the terminals of the standard capacity 420. When the signal $\overline{TR}$ is at zero, i.e. the signal TR is true, the field effect transistor 421 becomes a conductor and the standard capacity 420 remains short-circuited, hindering the operation of the capacity-frequency converter 400.

As the standard capacity 420 is of a fixed value, the operation of the capacity-frequency converter 400 does not produce any particular difficulty. It will simply be noted that the potentiometer 458 allows a control of the value of the standard frequency FE, supplied by the output of the gate 463, and thereby allows the numerical value to be defined which is associated with the complete measuring scale, in a manner which will be better understood later on.

On the other hand, the first converter 300 functions with a variable capacity, and consequently at a variable frequency. For the low values of the capacity (considerable load to be measured), the measurement frequency FM, powered by the output of the gate 364, may take on considerable values for which the internal delays at this first converter 300 are not negligible. We have found different methods for compensating for this delay.

According to a first compensation method, a capacitor 350 is mounted parallel with the resistor 348. Instead of the form illustrated in FIG. 5B, the current supplied to the reverser input of the amplifier 340 then has the form illustrated in FIG. 5C, i.e. with a slight peak after each release of the comparator. By means of the capacitor 350, a supplement of initial load is thus given to the capacity to be measured 320, 343, and this supplement of load will compensate for the effect of the delays. The output of the amplifier 340 then has the form of FIG. 5D.

The capacitor 350 may also be replaced by a capacitor 351, illustrated in dashed lines, and branched in parallel with the resistor 355. Another compensation means instead of the capacitors 350 and 351, comprises positioning a capacitor 352, also illustrated in dashed lines, between the non-reverser input and the output of the operational amplifier 340. Thus, the effect is to bring a signal of the form illustrated in FIG. 5D to the input of the comparator.

The comparison threshold is then modified by a quantity proportional to the measurement frequency FM.

Another difficulty of control appears, in particular in the field of weighing apparatus, and this is the control of the zero of the apparatus, which takes place at the level of the minimum value of the measuring frequency FM. It will be recalled that the NO-AND gate 364 has one of the inputs thereof connected to an input of the gate 361, as well as of gate 362, and also to the positive voltage at the terminal of the Zener diode 307. The other input of the gate 364 is connected to the output of the gate 361. Thus, between this last input of the gate 364 and the output thereof, there is a voltage which represents a crenel of the form illustrated in FIG. 5B. According to the present invention, this voltage is applied to a potentiometer 390, the sliding contact of which is connected to a resistor 391 which, for its part, is connected to the common point of a resistor 392 connected to the input of the comparator 360 (common point of the resistor 355 and the gate 361), and on the other hand, to a capacitor 393 which is connected to the positive voltage at the terminal of the Zener diode 307. By means of the resistor 391 and of the capacitor 393, an integration of the crenel voltage, of the form illustrated in FIG. 5B, is produced, and a fraction of the voltage thus integrated is applied by the resistor 392 to the common point of the resistors 355 and 356, i.e. to the input of the comparator. Thus, the resistor 392 adds a current of the form illustrated in FIG. 5E to the input of the comparator. In this manner, a fraction of the incline obtained thus by integration is superimposed on the crenel voltage. In other words, a fraction of the signal of FIG. 5A is added to the signal of FIG. 5B. The comparison threshold of a quantity inversely proportional to the frequency FM is thus modified, the coefficient being controllable by the potentiometer 390. Any means other than that which has been described and which allows this addition is naturally included in the scope of the present invention. This method of proceeding allows the weighing zero to be controlled, without at the same time modifying the relation which exists between a variation of the capacity to be measured and the corresponding variation of the measuring frequency FM (measurement range).

Another difficulty which is currently encountered with weighing apparatus is the fact that they have to operate in very different environments, for example in bathrooms in the case of bathroom scales, environments in which the humidity is sometimes very considerable. We have observed that the result of this is the occurrence of parasitic impedances between the plate 320 of the capacity to be measured and the frame of the apparatus. The present invention enables this undesirable effect to be avoided. For this purpose, the connection between the plate 320 and the reverse input of the amplifier 340 is advantageously encased, this encasement then being connected to the earth of the frame.

Finally, this earth is maintained at the same potential as the plate 320, for example, by using an operational amplifier 345, the reverser input of which is looped on the output thereof, connected to the said earth, while the non-reverser input thereof is connected to the plate 320 of the capacity to be measured. Here again, variations may be used, in particular by removing a signal in the comparator 360, since the integration of the crenel of FIG. 5B supplies a saw tooth signal of the form illustrated in FIG. 5A, thus exactly a voltage of the same form which this presents on the plate 320 (with the reservation of an inversion).

Thus, the present invention allows a satisfactory control of the factors affecting the transformation of the capacity to be measured into frequency. In the following, it will be assumed that these controls are carried out such that the maximum value of the measuring frequency, denoted as FMmax, is equal to ten times the value of the standard frequency FE, and that the minimum value of the measurement frequency, denoted as FMmin, is equal to half the maximum value FMmax.

Figure 4:
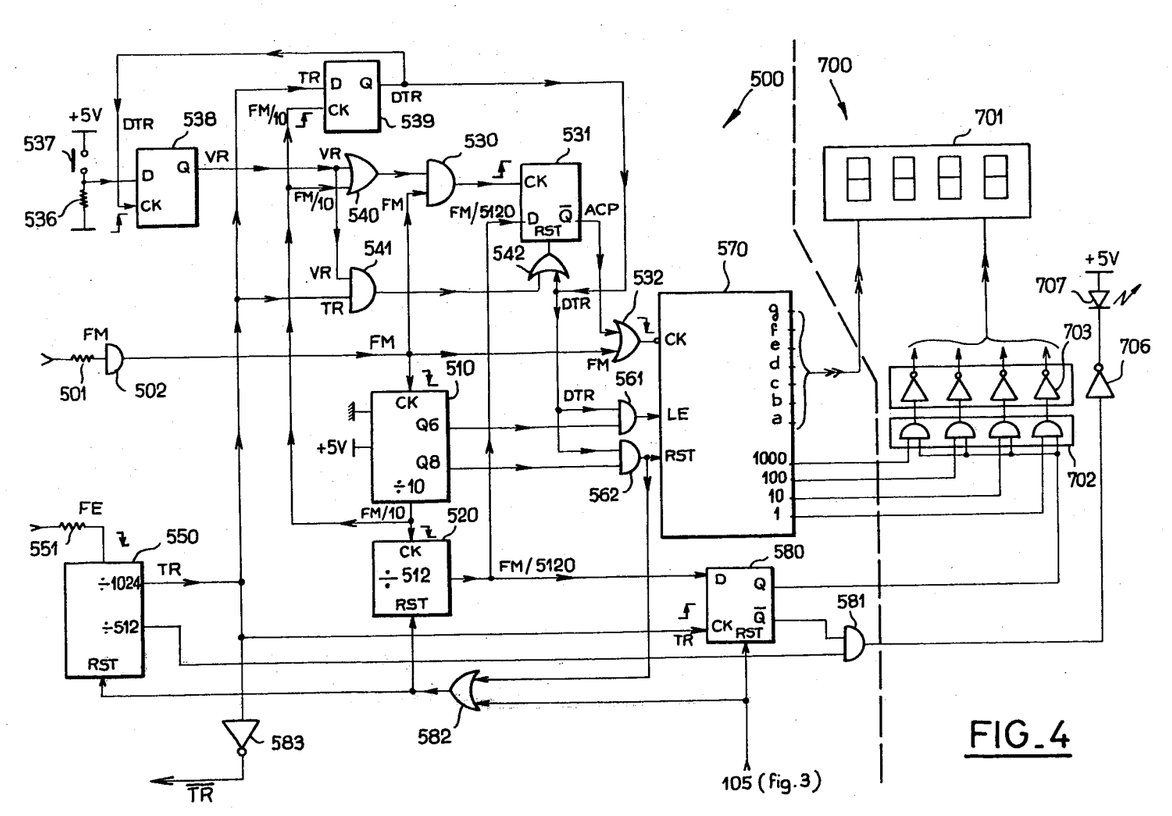
FIG. 4 illustrates a detailed electrical diagram of the logic calculation circuit and the display circuit appearing in FIG. 2.

Reference will now be made to FIG. 4 as well as to the corresponding wave forms illustrated in FIG. 6.

The standard frequency FE (FIG. 6B) is applied to a counter 550, of ten bits, and of which the most significant bit supplies an output signal TR, which changes in condition at the end of 1024 descending fronts of the frequency FE. With the aid of this signal TR, a measure is made as to how many pulses at the measuring frequency FM there are in 1024 pulses at frequency FE. It will naturally also be necessary to bear in mind the fact that the minimum measuring frequency FMmin corresponds to a zero weighed weight.

For its part, the measuring frequency FM is applied across a resistor 501 and a shaping gate 502 on one side to a decimal counter 510 with a single decade which counts on its descending fronts, on another side to an AND gate 530, on one of its inputs, and finally, on another side to an OR gate 532. The counter 510 is, for example, of the 4017 type, sold by NATIONAL SEMICONDUCTOR. Since the frequency FM is produced permanently, the counter 510 rotates permanently. It has an output divided by ten which supplies a signal FM/10; as the counter 510 is released on the descending fronts of the frequency FM, this signal FM/10 will change in condition at each fifth descending front, by using the carry over at the passage with five which is inside the counter. The form of the signal FM/10 is illustrated in FIG. 6E.

The counter 510 is followed by a second counter 520, a divider by 512, which reacts to the descending fronts of the signal FM/10. An output of the counter 520 supplies a signal denoted FM/5120, which will change in condition at the end of 5120 pulses at the measuring frequency FM.

Moreover, a trigger 538 supplies a signal VR, which will be assumed for the moment to be at the logic value 1. This signal VR is applied at the same time as the signal FM/10 to an OR gate 540, the output of which is thus also in the logic condition 1, thus validating the AND gate 530. Thus, the latter allows the pulses at the FM frequency which it receives to pass and the ascending fronts of these pulses are applied to the clock input of a trigger 531 of the D type, the control input D of which receives the signal FM/5120.

When 5120 pulses at the FM frequency have been counted by the counters 510 and 520, the signal FM/5120 passes to the logic level 1, and the trigger 531 changes condition on the ascending front immediately following the signal FM, the output thereof $\overline{Q}$ then delivering a signal ACP which passes at zero. The signal ACP is applied to the OR gate 532, and, passing at zero, it will allow the latter to let the pulses at the measuring frequency FM pass, the descending fronts of which then appear on the output of this gate 532 to be applied to the clock input CK of the memory counter (latch) 570, which is, for example, the model 74C925 of NATIONAL SEMICONDUCTOR.

On another side, the signal VR, assumed to be at the level 1, is also applied to an AND gate 541, which receives the signal TR which has already been mentioned, and due to the fact that the signal VR is at level 1, the signal TR will pass this AND gate 541 to terminate at an OR gate 542, the output of which controls the reset of the trigger 531, and consequently to reset this same trigger, which makes the output thereof $\overline{Q}$ pass to condition 1, and thus prevents the passage of the pulses at the measuring frequency FM across the OR gate 532 towards the counter 570.

When VR=1, the counting time interval of the counter 570 is thus defined by the signal ACP of FIG. 6I, and the number of pulses counted is illustrated by the signal CKCP in FIG. 6J. This figure illustrates by way of example that the counter sees 27 pulses, i.e. 27 descending fronts, in the example illustrated. The numerical magnitude obtained, in this case 27, is then displayed in a manner which will be described later on.

The arrangement shown in FIG. 4 also comprises a trigger 539 of the D type, which receives the signal FM/10 at its clock input, the signal being active by its ascending fronts, and receives the signal TR which has already been mentioned at its input D. The output Q of the trigger 539 thus supplies a signal which is staggered with respect to the signal TR, and this signal is denoted as DTR. The form thereof is illustrated in FIG. 6F, and it will be seen that the signal DTR will rise to level 1 at the time of the first ascending front of the signal FM/10, after the signal TR has passed level 1. This signal DTR returns to the zero level at the first ascending front of the signal FM/10 after the signal TR has redescended to the zero level.

It will now be assumed that the signal VR is at the zero level. The output of the gate 540 is at level 1 when the signal FM/10 is itself at level 1. For its part, the output of the AND gate 530 will only be at level 1 when the signals FM and FM/10 are both at level 1. The clock input of the trigger 531 will thus only be released on the first ascending front of the signal FM which itself follows an ascending front of the signal FM/10. This case where VR is at zero is illustrated in FIG. 6K, where it may be seen that the ascent of the signal ACP is delayed with respect to situation which existed in FIG. 6I. The end of the signal ACP remains to be defined, i.e. the return thereof to zero.

Due to the fact that the signal VR is now at zero, the gate 541 is inactive, and it is the signal DTR itself which will pass across the OR gate 542 to ensure the reset of the trigger 531. This trigger will only return to zero, to interrupt the counting in the counter 570, when the signal DTR re-ascends to level 1. It will be seen immediately that the counting operation will then only take place during a complete number of decades defined by the counter 510. The result thereof is that the measured value is rounded off. In effect, by counting the number of descending fronts present in the signal CKCP of FIG. 6L, it will be seen that this signal now comprises 30 pulses, the numerical value 30 constituting the ordinary rounding off of the value 27.

It will be noted that for the counting of the very last pulse (the thirtieth), the delays introduced by the gate and the trigger should be considered. In a very brief time interval, a descending front of signal FM of FIG. 6A initially takes place, marked by the number 1 in a circle, then the ascending front of the signal FM/10 (denoted as 2 in FIG. 6E), at the same time as a descending front of the signal CKCP (also denoted as 2 in FIG. 6L), then the reascent of the signal DTR (denoted as 3 in FIG. 6F), and finally the reascent of the signal CKCP denoted as 4 in FIG. 6L.

Moreover, it will be seen that the signal DTR is only true after the end of the counting of the numerical value according to the invention. This signal DTR is applied to an AND gate 561, which also receives the decoded output 6 of the counter 510 (signal Q 6 of FIG. 6G). In the presence of this signal Q 6, applied to the THE input of the counter 570, the latter transfers the measured value from its counting section to its memory section. Shortly afterwards, the decoded output 8 of the counter 510 is in turn actuated (FIG. 6H), and this output is applied at the same time as the signal DTR to the AND gate 562, to reset the counting section of the principal counter 570. The output of the AND gate 562 is also applied across an OR gate 582 for the reset of the counters 520 and 550, thus allowing the recommencement thereof. It will also be noted that the gate 582 receives the signal issued from the AND gate 105 of FIG. 3, to also ensure the reset of these counters when the output of the AND gate 105 becomes 1 (capacitor 103 charged). Finally, the signal TR had remained true until this reset. After a complementation by the reverser 583, the signal TR was used in the manner already indicated to make the field effect transistor 421 (FIG. 3) conduct and thus block the oscillator at the standard frequency while the signal TR is in the true condition.

In order to fully understand the operation of the circuits in FIG. 4, it is appropriate to recall that these are permanently fed. For each new measurement, upon operation of the push button 101 of FIG. 3, it therefore remains in the condition defined at the end of the previous measurement.

Thus, it will be easily comprehended how the signal VR which has already been mentioned is produced. If the lens push button 537 is not operated, the first ascent front of the signal DTR will transform the trigger 538 to the false condition, the output Q thereof thus being at zero, and the signal VR being equal to zero. This is the rounding off operation previously described, with reference to FIGS. 6K and 6L. If, on the other hand, the operator pushes the push button 537, the first ascending front of the signal DTR will transform the trigger 538 to the true condition, the signal VR thus being equal to 1, and this is the operation with a lens and without rounding off previously described with reference to FIGS. 6I and 6J.

Figure 6:
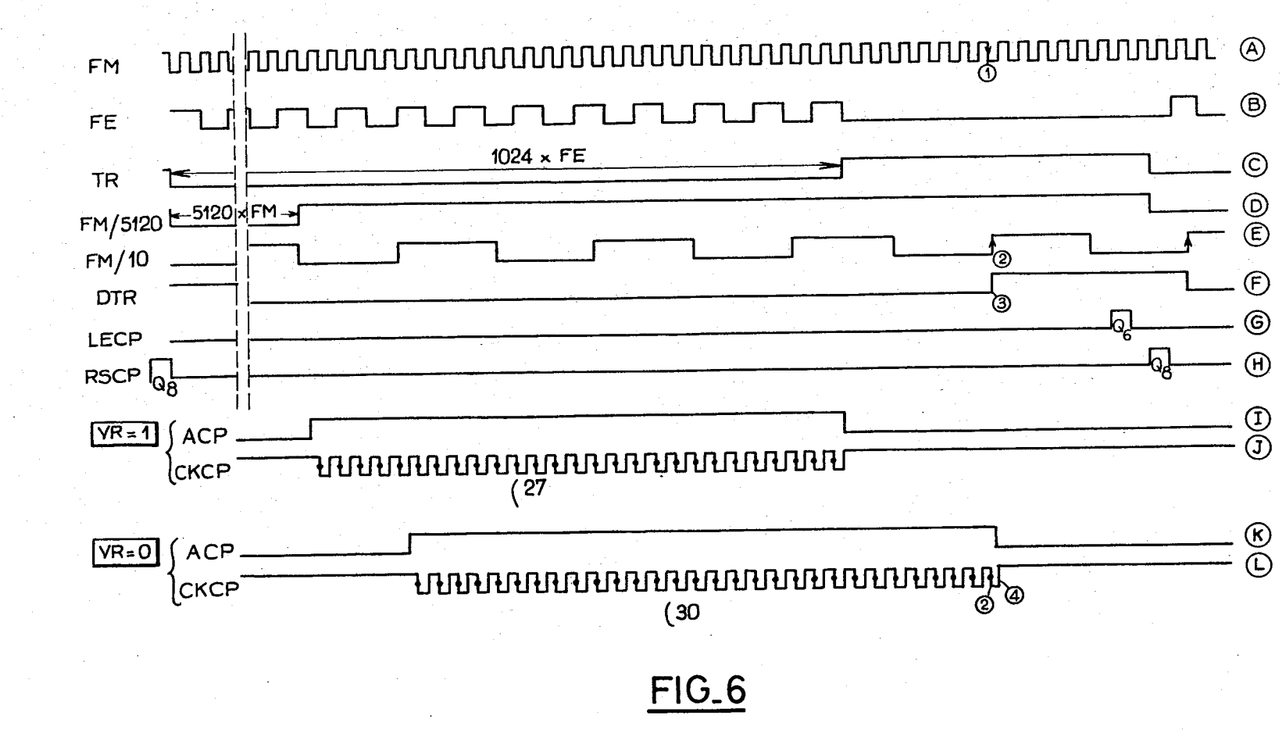

It should now be recalled that the circuit 100 controls the supply of the converters 300 and 400 for approximately one minute, which corresponds to numerous measuring cycles, such as that illustrated in FIG. 6. After the first measurement, this is then transferred into the memory portion of the counter 570, while a new measurement is made in the counting portion thereof.

The memory portion of the counter 570 is provided with a multiplexed display for operation, for which it releases the indications relating to each decimal number at the outputs a to g, which are thus applied to a decimal display 701. The decade outputs, denoted as 1, 10, 100 and 1000, are applied to a set of AND gates 702, the outputs of which control the different individual displaying devices of the circuit 701 by means of reversers 703.

A D type trigger 580 receives the signal TR at its clock input, and the signal is active by its ascending fronts, and its input D receives the signal FM/5120. The output Q of this trigger 580 will thus pass to level 1 on the ascending front of the signal TR, provided that the oscillator with measuring frequency has passed 5120 (this may not be achieved for the very first measurement after pressing on the push button 101 of FIG. 3). After this condition has been produced, the output Q of the trigger 580 will validate the gates 702 and will thus allow the display of the measured value. This display is renewed each time the counter 570 transfers a new value from its counting section to its memory section. Where the counting at the measuring frequency has not passed 5120 (a case already seen), or on the contrary, twice passes 5120 (exceeding the complete scale), it is then the output Q of the trigger 580 which is in the true condition. This output is applied to an AND gate 581 which also receives an output divided by 512 of the counter 550. Insofar as this counter has exceeded half its excursion, the AND gate 581 will then operate a reverser amplifier 706 which illuminates an electroluminescent diode 707 across a resistor 703. The function of the diode 707 is to indicate that the measurement is not in the authorized place, because the measuring frequency is below the minimum frequency, or beyond the maximum value. The trigger 580 may be reset by the output of the gate 105.

By denoting the value of the load to be measured as P, it will be seen that the connection according to the present invention provides the numerical magnitude given by the expression:

P=1024·FM/FE-5120 or, by stating M=1024 and N=5120, the more general relation:

P=M·FM/FE−N.

Actuation of the potentiometer 456 of FIG. 3 allows the FE/N ratio to be brought into action, consequently calling into action the value of the complete measuring scale.

For their part, the means 390 to 393 which were described with respect to FIG. 3 allow an adjustment of the minimum value of the measuring frequency FM, by acting on this at the level of the first capacity-frequency converter 300.

Figure 7:
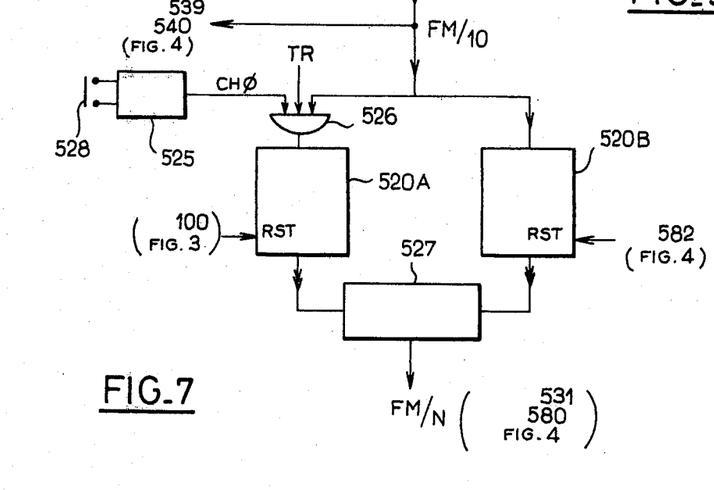
FIG. 7 illustrates a variation of the circuit of FIG. 4, which allows an automatic reset.

The present invention also allows an automatic adjustment of the minimum frequency, with the aid of means illustrated in FIG. 7 which replace the counter 520 of FIG. 4. The counter 520 is now divided into two counters 520 A and 520 B, to allow a pre-control of the maximum value counted. Any other means allowing this pre-control with the aid of a single counter are naturally included in the scope of the present invention. The signal FM/10 is applied directly to the counter 520 B; it is applied to the counter 520 A across an AND gate 526 which also receives the signal TR, as well as a signal CHφ, arising from a circuit 525. The counter 520 A is reset by the signal which has issued from the signal 100 (output of the gate 105). The counter 520 B is reset by the signal issuing from the gate 582, as was the counter 520 in FIG. 4. All the parallel outputs of the counters 520 A and 520 B are applied to a numerical comparator 527 which now supplies a signal FM/N which is applied to the circuits 531 and 580 of FIG. 4 instead of the output of the counter 520. While there is no load on the plate of the weighing apparatus, the operator pushes a zero load push button 528, and the information is transformed into a logical signal in a known manner by a circuit 525 and hence the signal CHφ is in the true condition. The measurement which is thus made by the circuit according to the invention is introduced by the counter 520 A, in which it will remain unchanged after the push button 528 has been released. The counter 520 A will thus contain a value N which corresponds to the number of pulses at the measuring frequency for the zero load. Subsequently, in the presence of a load, the pulses which have been counted are only applied to the counter 520 B and when the latter reaches the count N defined by the counter 520 A, the output of the numerical comparator 527 is actuated, indicating that the N pulses at the frequency FM are exceeded, which corresponds to the zero load.

It will be seen that this circuit very simply allows an automatic adjustment of the weighing zero.

By way of example, the triggers 531, 538, 539 and 580 may be the 4013 models of NATIONAL SEMICONDUCTOR, and the counters 520 and 550 may be the 4040 models, marketed by the same company.

The present invention is naturally not restricted by the above-described embodiments, and applies to any variation which is consistent with its spirit.

In this respect, it is possible to devise numerous variations of calculation circuits, in particular to replace the discrete components by a microprocessor. On the other hand, it is possible to include a frequency multiplication between the capacity-frequency converters and the calculation circuits, which would allow the converters to operate at a lower frequency.

We claim:

1. A measuring device for a weighing apparatus with a capacitive transducer, which comprises:
   (a) a first capacity-frequency converter, operating on the capacity to be measured and supplying a measurement frequency FM,
   (b) a second capacity-frequency converter, operating on a standard capacity and supplying a standard frequency FE,
   (c) a calculation circuit able to determine a numerical magnitude dependent on the ratio of the measurement frequency FM to the standard frequency FE, and
   (d) a display circuit connected to the logic calculation circuit and suitable for displaying the numerical value of the said magnitude.

2. A capacity measuring device according to claim 1, wherein the first capacity-frequency converter functions continuously, while the second capacity-frequency converter is stopped temporarily after the numerical magnitude has been determined by the calculation circuit, the end of this stop being synchronised in phase with the measurement frequency FM.

3. A capacity measuring device according to claim 1, wherein each capacity-frequency converter comprises an operational amplifier on which the associated capacity is branched in an integrating connection, followed by a comparator circuit with two outputs, one of which supplies the output frequency FM, FE while the other is looped on the reverser input of the operational amplifier.

4. A capacity measuring device according to claim 3, wherein the tripping threshold of one of the comparator circuits is controllable.

5. A capacity measuring device according to claim 3, wherein the first capacity-frequency converter comprises a capacitive means to compensate the internal delays thereof.

6. A capacity measuring device according to claim 3, wherein the first capacity-frequency converter comprises means for the production of a correction signal which modifies the comparison threshold of a quantity inversely proportional to the measurement frequency FM, the coefficient being controllable, which allows a manual zero control.

7. A capacity measuring device according to claim 3, wherein the connection between a plate of the capacitor to be measured and the reverser input of the associated operational amplifier is encased, means are provided to maintain this connection and the encasement thereof substantially at the same potential, and this same encasement is connected to the earth of the neighbouring frame of the capacitor to be measured, which renders the device only slightly sensitive to leakage currents notably due to the ambient humidity.

8. A capacity measuring device according to claim 1, wherein the minimum value of the measuring frequency FM is greater than the value of the standard frequency FE, and the calculation circuit comprises a reference counter capable of defining a signal TR representing a reference period, counted over a predetermined number M of pulses of the standard frequency FE, a counter measuring circuit released at the same time as the reference counter and capable of counting another predetermined number N of pulses at the measurement frequency FM, a principal memory counter and logic means to apply the pulses at the measurement frequency FM existing during the reference period TR to this principal counter, but after the measuring counter has reached the predetermined count N, the contents of the principal counter thus being in the form of M·(FM/FE)31 N.

9. A capacity measuring device according to claim 8, wherein the measuring counter circuit comprises a first decade counter stage and the logic means are commutable to only authorize counting over a complete number of periods of the decade counter, which allows a number of the numerical magnitude displayed to be rounded off on command.

10. A capacity measuring device according to claim 8, wherein the measuring counter is at least partly a precontrollable counter and control means are provided to pre-control the number N by acting on this counter for a pre-determined condition of the capacity to be measured, such as the absence of a load on the weighing apparatus.

11. A digital weight displaying device for a weighing apparatus having a capacitive load transducer, the capacitance of the transducer varying from a maximum value to a minimum value when the weight to be measured is varied from zero to the full scale weight, said device comprising:
first capacitance-frequency converter means coupled to said capacitive transducer and arranged for producing a signal having a weight related frequency FM inversely proportional to the capacitance of said capacitive transducer,
means for producing a standard signal having a standard frequency FE, means for producing a digital output having a digital value P defined as
$P = M \cdot (FM/FE) - N$
where M and N are quantities being such that P equal O for said maximum capacitance value and P equals the full scale weight in a selected weight unit for said minimum capacitance value, and
display means for displaying said digital value P.

12. A device according to claim 11 wherein:
said first capacitance-frequency converter means comprises an operational amplifier having a non-inverting input coupled to a reference voltage, an inverting input, and an output, said inverting input and said output being coupled across said capacitive transducer; and
a Schmitt trigger comparator having an input coupled to the output of said operational amplifier, an output coupled to said inverting input of said operational amplifier, and another output which delivers said signal having said weight related frequency FM.

13. A device according to claim 12, wherein:
the first capacitance-frequency converter means comprises a capacitive means to compensate the internal delays thereof, thereby improving said relationship between the frequency FM and the capacitance of said capacitive transducer.

14. A device according to claim 12, wherein:
the first capacitance-frequency converter means comprises means for producing a correction signal which modifies the comparison threshold of said comparator by a quantity inversely proportional to the measurement frequency FM, the coefficient of inverse proportionality being controllable, which allows a manual zero control.

15. A device according to claim 12, including: means for shielding the connection between said capacitive transducer and the inverting input of the operational amplifier; means for maintaining said connection and said shielding means substantially at the same potential; and means connecting said shielding means to the earth of the neighboring frame of the capacitor to be measured, which renders the device only slightly sensitive to leakage currents notably due to the ambient humidity.

16. A device according to claim 11, wherein:
the minimum value of the measuring frequency FM, which corresponds to the maximum capacitance of said capacitive transducer, and, therefore, to zero weight, is greater than the value of the standard frequency FE;
said digital output producing means comprises a reference counter capable of defining a signal TF representing a reference period, counted over a predetermined number M of pulses of the standard frequency FE, a measuring counter circuit released at the same time as the reference counter and capable of counting another predetermined number N of pulses at the measurement frequency FM, a principal memory counter, and logic means adapted to apply the pulses at the measurement frequency FM existing during the reference period TR to this principal counter, only after the measuring counter has reached the predetermined count N, the contents of the principal counter thus being in the form of $P = M \cdot (FM/FE) - N$.

17. A device according to claim 16, wherein:
the measuring counter circuit comprises a first decade counter stage; and said logic means being switchable to only enable counting over a complete number of periods of the said decade counter stage, which allows the least significant digit of the digital value to be displayed to be rounded off on command.

18. A device according to claim 16, wherein:
said measuring counter is at least partly pre-settable; and including
control means for pre-setting the number N to obtain a zero digital value in the absence of a load on the weighing apparatus.

19. A device according to claim 11, wherein:
said means for delivering a standard frequency comprise a second capacitance-frequency converter coupled to a standard capacitor.

20. A device according to claim 19, wherein:
the first capacitance-frequency converter operates continuously, while the second capacitance-frequency converter is stopped temporarily after the digital value has been determined by the digital output producing means, and is then restarted synchronized in phase with the measurement frequency FM.

21. A device according to claim 19, wherein:
said second capacitance-frequency converter comprises a second operational amplifier having a non-inverting input coupled to a reference voltage, and having an inverting input and an output coupled across said standard capacitor, and a second Schmitt trigger comparator having an input coupled to the output of said operational amplifier, an output coupled to said inverting input of said operational amplifier, and another output which delivers said standard signal having said standard frequency FE.

22. A device according to claim 20, wherein:
the threshold of said second comparator is adjustable, whereby said standard frequency FE is adjustable.

* * * * *